United States Patent
Eric

(10) Patent No.: US 12,530,786 B2
(45) Date of Patent: Jan. 20, 2026

(54) ELECTRONIC ASSESSMENT OF PLAYING SURFACE PROPERTIES

(71) Applicant: TARKETT SPORTS CANADA INC., Montreal (CA)

(72) Inventor: Habib Eric, Montreal (CA)

(73) Assignee: TARKETT SPORTS CANADA INC., Montreal (CA)

( * ) Notice: Subject to any disclaimer, the term of this patent is extended or adjusted under 35 U.S.C. 154(b) by 436 days.

(21) Appl. No.: 18/020,178

(22) PCT Filed: Aug. 25, 2021

(86) PCT No.: PCT/CA2021/051178
§ 371 (c)(1),
(2) Date: Feb. 7, 2023

(87) PCT Pub. No.: WO2022/040796
PCT Pub. Date: Mar. 3, 2022

(65) Prior Publication Data
US 2023/0289981 A1    Sep. 14, 2023

Related U.S. Application Data

(60) Provisional application No. 63/070,175, filed on Aug. 25, 2020.

(51) Int. Cl.
*G06T 7/246* (2017.01)
*G01N 19/02* (2006.01)
(Continued)

(52) U.S. Cl.
CPC ............ *G06T 7/248* (2017.01); *G01N 19/02* (2013.01); *G01P 3/38* (2013.01); *G01P 13/00* (2013.01);
(Continued)

(58) Field of Classification Search
CPC . G06T 7/248; G06T 7/74; G06T 2207/30224; G06T 2207/30241;
(Continued)

(56) References Cited

U.S. PATENT DOCUMENTS

8,336,883 B2 * 12/2012 Smalley ............. A63B 24/0021
273/317.6
2021/0102795 A1 * 4/2021 Aldahir ..................... G01B 5/28
(Continued)

FOREIGN PATENT DOCUMENTS

EP    2034426 A1      3/2009
EP    2385497 A1 * 11/2011  ............. G06T 7/292
(Continued)

*Primary Examiner* — Pinalben Patel
(74) *Attorney, Agent, or Firm* — McDonald Hopkins LLC

(57) ABSTRACT

Playing surface properties can be assessed electronically. A ball can be launched onto the playing surface, and movement of the ball recorded. Ball movement information can be derived from a recording of ball movement. A ball's position in pixels in each frame of recording can be translated to a real-world position of the ball to determine the ball's path or trajectory. Further ball movement information, such as bounce height and spin, can be determined based on the trajectory and other information. Properties of the playing surface, including a coefficient of friction, coefficient of restitution, and deviation angle, can be determined based on the ball movement information. The properties can then be output and utilized to determine whether the playing surface meets expectations or if maintenance is required, among other things.

20 Claims, 10 Drawing Sheets

(51) Int. Cl.
  *G01P 3/38* (2006.01)
  *G01P 13/00* (2006.01)
  *G06T 7/73* (2017.01)
  *H04N 7/18* (2006.01)

(52) U.S. Cl.
  CPC .............. *G06T 7/74* (2017.01); *H04N 7/188* (2013.01); *G06T 2207/30224* (2013.01); *G06T 2207/30241* (2013.01)

(58) Field of Classification Search
  CPC ........... G01N 19/02; G01P 3/38; G01P 13/00; H04N 7/188
  See application file for complete search history.

(56) References Cited

U.S. PATENT DOCUMENTS

2021/0264141 A1* 8/2021 Chojnacki .............. G06V 40/25
2022/0088455 A1* 3/2022 Wang ...................... G06T 7/168

FOREIGN PATENT DOCUMENTS

| EP | 2945121 A1 | 11/2015 |
| KR | 101295788 B1 | 8/2013 |
| WO | WO2021051084 A1 | 3/2021 |

* cited by examiner

ELECTRONIC ASSESSMENT OF PLAYING SURFACE PROPERTIES

CROSS-REFERENCE TO RELATED APPLICATION

This application claims the benefit of U.S. Provisional Application No. 63/070,175, filed Aug. 25, 2021, and entitled "ELECTRONIC SYSTEMS FOR ASSESSING PROPERTIES OF PLAYING SURFACES," the entirety of which is incorporated herein by reference.

BACKGROUND

Current testing of the performance and functional state of artificial turf fields requires expensive equipment and trained personnel to execute complex procedures to determine characteristics of the field. Deltec Equipment, for example, offers several systems for testing various aspects of turf fields, such as the Advanced Artificial Athlete. Existing systems evaluate characteristics related to player safety, which is of primary importance.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

In brief, aspects of this disclosure concern electronic assessment of properties of a playing surface, such as an artificial turf field designed to meet particular performance requirements. A set of ball movement capture devices, such as cameras, can be positioned around and above a playing surface. A ball launcher can shoot the ball onto the surface at a particular speed and angle. A computing device can be configured to trigger ball launches and image capture. Subsequently, the computing device can analyze images or frames recording ball movement to determine ball movement information associated with interaction with the playing surface, including speed and angle in and out, bounce height and spin. The ball movement information can then be employed to determine surface properties such as a coefficient of friction, coefficient of restitution, deviation, or a combination thereof The surface properties can be output and used for surface comparison to expected properties and to drive maintenance, among other things.

In accordance with one aspect, a system is disclosed comprising a processor coupled to a memory that stores instructions to perform surface property assessment. When the processor executes the instructions, the processor is caused to extract ball movement information from a sequence of images, or frames, that record ball movement across a playing surface to be assessed. The ball movement information can be obtained by the location of the ball in the images and translation of a position of the ball in pixels in each of the images into a real-world position of the ball to determine ball trajectory. Next, the instructions can cause the processor to determine a property of the playing surface based on the ball movement information. The determined property includes a coefficient of friction, a coefficient of restitution, or a deviation angle. In one instance, the location of the ball in each frame includes isolation of pixels corresponding to the ball from the background in each of the frames using hue saturation value (HSV) filtering and movement detection. In another instance, a template matching approach can be employed in which one or more pictures of a ball are taken beforehand, and the ball pictures are used as a template to locate the ball in a larger image and follow its movement.

Translation of the position of the ball in pixels into real-world position of the ball can include automatic extraction of pixels corresponding to reference objects to measure pixel distance between reference objects. Further, translation of the position of the ball in pixels in each of the frames into real-world position of the ball can also include calculation of a pixel-to-distance ratio using vertical change in the trajectory of the ball in pixels in the frames. In particular, the vertical acceleration in pixels is equivalent to the acceleration of gravity. Of course, a combination of reference objects and ball movement can be utilized.

Extraction of the ball movement information from the frames can further comprise determining the ball's speed based on the ball's real-world position and timing information from recorded frames. The instructions can also cause the processor to determine bounce and crest positions by identifying local minima and local maxima in the ball trajectory. Further, the instructions can cause the processor to determine ball spin based on identifying the center of the ball and detecting features of the ball in the one or more frames and tracking the features that move in the frame with reference to the center of the ball.

The system can further comprise a ball launcher configured to shoot a ball onto the playing surface, and a ball capture system comprising at least one camera and configured to record the one or more frames showing the ball. The instructions further cause the processor to communicate with and operate at least one camera to record the one or more frames showing the ball in response to the ball launcher shooting the ball. The instructions can further cause the processor to extract the ball movement information based on ball capture information from one or more sensors associated with the ball and ball launch information from one or more sensors associated with a ball launching device or a person.

The instructions further cause the processor to generate expected ball movement information based on predetermined test conditions and determine the property of the playing surface based on the extracted ball movement information and comparison of the extracted ball movement information with the expected ball movement information.

According to another aspect, a method is disclosed. The method comprises detecting a ball shot onto a playing surface by a ball launcher, triggering recording of the ball by a camera in response to detecting the ball shot onto the playing surface, extracting ball movement information from recorded frames, determining a playing surface property from the ball movement information, wherein the playing surface property is a coefficient of friction, a coefficient of restitution, or a deviation angle, and transmitting, for display on a display device, the playing surface property. Extracting the ball movement information can comprise locating the ball in each of the frames and translating a position of the ball in pixels in each of the frames into a real-world position of the ball to determine ball trajectory. Further, extracting the ball movement can comprise determining ball spin by identifying the center of the ball, detecting features of the ball in the one or more frames, and tracking the features that move in the frame in reference to the center of the ball.

The method can further comprise configuring the ball launcher with a predetermined angle, direction, height, tension, or a combination thereof based on predetermined ball launcher configuration information. Further, the method can comprise determining the ball movement information based on ball capture information from one or more sensors associated with the camera and ball launch information from the one or more sensors associated with the ball launcher.

The method can further comprise determining the playing surface property based on the extracted ball movement information and a comparison of the extracted ball movement information with expected ball movement information generated based on predetermined test conditions.

In accordance with another aspect, a method of assessing properties of a field is disclosed that includes executing, on a processor, instructions that cause the processor to perform operations. The operations include conveying, for display on a display device, user instructions requesting a user perform an action on the field, operating a camera to record one or more frames, determining if the user performed the action based on the one or more frames, conveying, for display on the display device, adjusted user instructions when the user did not properly perform the action, and extracting ball movement information from the one or more frames when the user did properly perform the action. The operations further comprise determining properties of the field from the ball movement information. The properties include a coefficient of friction, a coefficient of restitution, a deviation angle, or a combination thereof. The operations can also include conveying, for display on the display device, the properties. Extracting the ball movement information can further comprise locating the ball in each of the one or more frames and translating a position of the ball in pixels in each of the one or more frames into a real-world position of the ball to determine ball trajectory. The ball movement information can also be determined based on ball capture information from one or more sensors associated with the camera and ball launch information from one or more sensors associated with a ball launcher. The method can also include operations comprising generating an expected ball movement information based on predetermined test conditions, and determining the properties of the field based on a comparison of the extracted ball movement information with the expected ball movement information.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Existing playing surface test systems evaluate characteristics related to player safety rather than field playability. Although this results in safe fields, many players dislike such fields and sometimes purposely avoid playing on them. While player safety is of primary importance, play performance characteristics are often ignored, reducing field use.

Details disclosed herein generally pertain to electronic assessment of playing surface properties. A ball launcher can shoot a ball onto a field or other surface to be assessed. The ball launcher can be configured to have a predetermined angle, direction, height, tension, or combination. One or more movement capture apparatuses, such as a camera or Lidar, can be coordinated to record one or more images or frames that show the ball in response to the shooting of the ball by the ball launcher and interaction with a surface. Ball movement information, such as trajectory, spin, and bounce characteristics, can be extracted from the recorded images. In one instance, the ball can be located in each image, and the ball's position can be analyzed to determine the ball's trajectory. Properties of a playing surface can be determined from the ball movement information. The properties can include a coefficient of friction, coefficient of restitution, deviation angle, or combination thereof. Contextual data, such as temperature, humidity, and time of day, can also be recorded and utilized to adjust or aid understanding of the properties.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
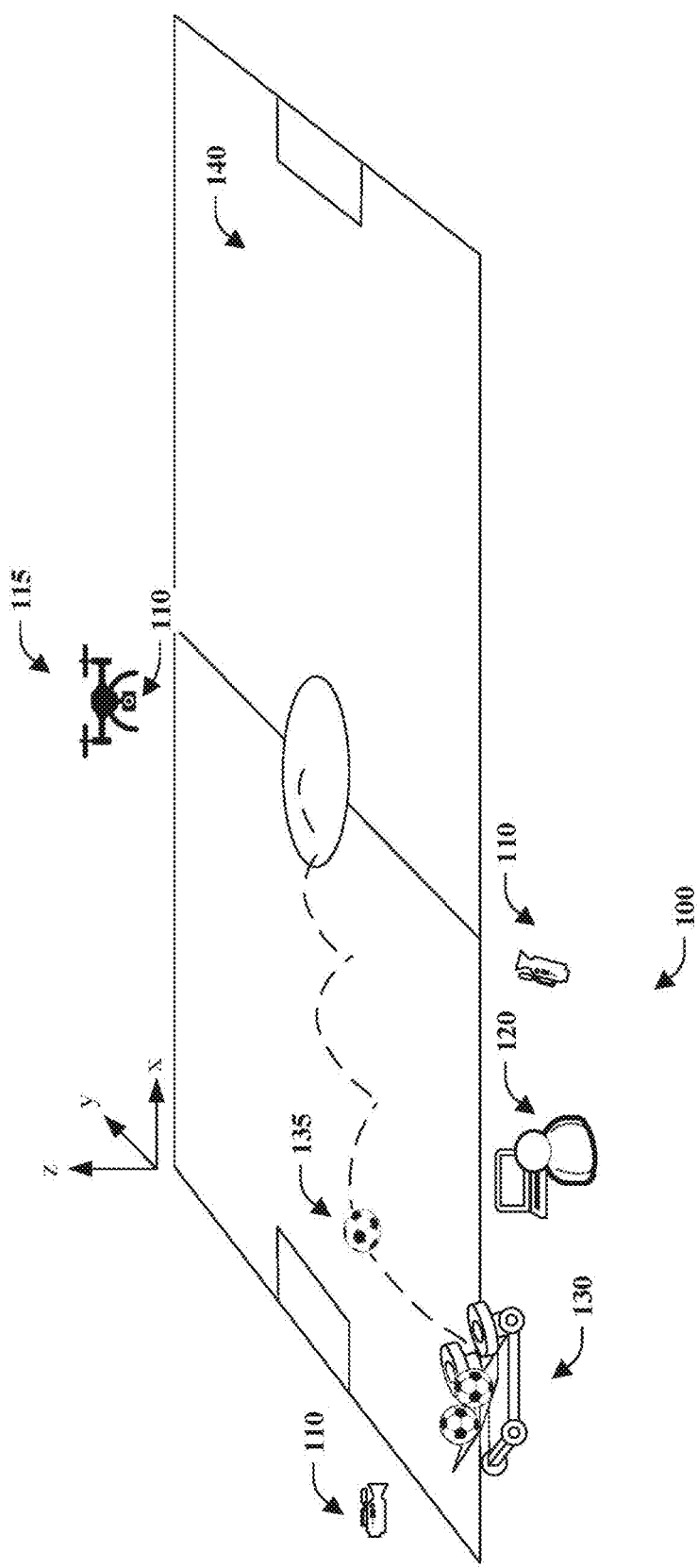
FIG. 1 illustrates an overview of an example implementation of electronic assessment of playing surface properties.

Referring initially to FIG. 1, a high-level overview of an example implementation is depicted. As shown, the implementation includes a portable surface assessment system 100 that operates in situ with a playing surface 140. The system 100 includes one or more movement capture apparatuses 110, computing device 120, ball launcher 130, and ball 135. Although not limited thereto, the surface assessment system 100 is suited for determining actual mechanical, performance, safety, or other physical properties of athletic playing surfaces provided by an artificial turf field or hybrid field. The system 100 can utilize a few visual recordings to quickly determine current field performance characteristics, for example, by direct or indirect measurements related to the field's playability. By contrast, existing conventional systems require complicated and expensive equipment that is time-consuming. Components of the surface assessment system 100 and the playing surface 140 are not shown to scale.

The surface assessment system 100 operates over the playing surface 140. The surface assessment system 100 is configured to determine properties or characteristics of the playing surface by way of direct or indirect measurement. As depicted, the playing surface 140 is an artificial turf soccer field. Of course, the playing surface 140 could be artificial turf associated with other sports, such as baseball and field hockey, or even an alternate surface type, such as hardwood for basketball and ice for hockey.

One or more movement capture apparatuses 110 capture ball movement with respect to the playing surface 140 for the surface assessment system 100. The movement capture apparatuses 110 can be positioned at various points around the playing surface 140. In one instance, the movement capture apparatuses 110 can correspond to multiple imaging devices such as cameras that record a sequence of images or frames. As shown, a first movement capture apparatus 110 is positioned to capture the width of the field, and a second movement capture apparatus is set to record the length of the field. The movement capture apparatuses 110 can include one or more drones 115 with imaging capability. In FIG. 1, a third movement capture apparatus 110 is located on a drone 115 to capture vertical distance. Thus, the movement capture apparatuses 110 can produce a three-dimensional surface representation in an x, y, and z coordinate system. Of course, more movement capture apparatuses 110 can be utilized to track the movement of a ball or other object on the playing surface 140. The movement capture apparatuses 110 can capture images, video, or audio showing ball movement with respect to the playing surface 140. The movement apparatuses 110 can thus correspond to cameras or video recorders. Further, the movement capture apparatuses 110 can correspond to a Lidar (Light Detection and Ranging) device that uses light from a pulsed laser to produce images. To acquire vertical images, imaging devices can be mounted on a drone 115 or obtained from another airborne means such as a lift-mounted camera or satellite-imaging device. Further, the image capture apparatuses 110 can be configured to track a ball.

The ball launcher 130 corresponds to a mechanism that can launch balls 135 onto the playing surface 140. The ball launcher 130 can be operable to shoot a ball at a predetermined angle, direction, height, tension, speed, or combination based on a ball launcher configuration. In some embodiments, the ball launcher 130 can include sensors attached to a ball, the launcher, or other objects whose state may contribute to the determination of ball movement and surface properties. Such sensors can include accelerometers, gyroscopes, magnetometers, or force sensors. Further, while the ball launcher 130 is illustrated as a physical machine, in one instance, the ball launcher 130 could correspond to a person instructed to throw, kick, hit, or drop balls onto the playing surface 140 in particular ways by the computing device 120.

The computing device 120 comprises a combination of hardware and software operable to control surface assessment. The computing device 120 can interact with the movement capture apparatuses 110 and the ball launcher 130 to set up tests and receive data associated with such tests. The computing device 120 can utilize information received from a set of movement capture apparatuses 110 (e.g., cameras, drone, Lidar . . . ) and the ball launcher 130, as well as attached or corresponding sensors, to derive ball movement information or characteristics, such as trajectory, bounce, and spin.

In one instance, the computing device 120 can extract ball movement in various images or frames captured by the movement capture apparatuses 110. Computer vision based object detection techniques can be employed to identify a ball. The object detection can involve object segmentation in which specific ball pixels are identified alone or in conjunction with bounding boxes of conventional object detection. In one instance, a deep convolutional neural network can be employed to identify the ball in an image or frame. Additionally, or alternatively, a color-based filtering approach, such as HSV (Hue Saturation Value) image filter, can be employed. Furthermore, a template matching approach can be utilized in which one or more pictures of the ball can be taken beforehand and then used as a template to find the ball in a larger image and follow its movement.

After the ball is located and isolated from the background, the ball's position in pixels can be translated into a real-world position of the ball to determine the ball's trajectory. One or a combination of two processes can be utilized to perform this translation. In a first process, internal controls or sets of reference objects in the frame separated by a known distance (e.g., strategically placed cones on the field) are automatically detected using the same or different techniques used to identify ball pixels (e.g., HSV filtering, value thresholding, blurring, and key point detection . . . ). The pixel distance between these objects is measured and correlated with the known actual distance between them. This enables scale information to be obtained, such as a pixel-to-distance ratio. The scale information can then be applied to the ball to determine the ball's real-life position in each frame, and consequently, the ball's trajectory in a recording. In a second process, vertical acceleration of the ball during free fall can be employed to determine scale. Vertical acceleration in the frames in pixels is equivalent to the acceleration of gravity. Thus, when the ball is in free fall, the software can use vertical position changes in pixels between frames to generate a curve fit function of the trajectory and obtain scale information, such as the pixel-to-distance ratio. The computing device 120 can also employ scale information, such as a pixel-to-distance ratio, to apply to a ball to determine the ball's real-world position in each frame and thus the ball's trajectory. The real-world position can therefore correspond to a virtual or computer representation of the world that accurately captures the scale and distance of the ball and other objects in a scene. Additional ball movement information can subsequently be determined. For instance, once the pixels representing the ball are converted to real-world position using one or both of the first and second processes and the ball's trajectory is determined, the speed of the ball can be calculated based on timing information included in recording (e.g., timing between frames).

The computing device 120 can also determine bounce position from local minima of the curve of the ball's trajectory after optionally using a smoothing function to remove noise. To compute crests, the local maxima of the curve of the ball's trajectory can be identified, and optionally cross-reference can be made with a curve-fit function to account for noise. Ball speed in and out of a bounce can be determined based on known physics as well as the timing of each image or frame.

The computing device 120 can determine ball spin from features of the ball detected during isolation of the ball from the background. A frame of reference can be set on a ball, and movement of identified features or key points relative to the frame can be tracked in order to compute how the ball is turning.

Surface properties can be derived from the ball movement information, including a coefficient of friction, coefficient of restitution, deviation angle, or combination thereof. The coefficient of friction is the ratio of force required to move two sliding surfaces. In the context of a playing surface, the coefficient of friction is associated with how much topspin a surface imparts on a ball after impact. High topspin reduces the distance a ball will travel, as high topspin will induce a downward force. The coefficient of restitution is a ratio of the final and initial velocity between two objects after they collide. The coefficient of restitution relates to the energy of a ball that is absorbed by the surface and can affect how high a ball bounces after impact with a surface as well as ball speed. The deviation angle is an angular measurement of the difference in a ball's path on a surface from a target line, wherein the target line, or ideal line, is a straight line from the ball to an intended target. The deviation angle and spin determine a ball's final position relative to the target line. Other properties are also contemplated including, but not limited to horizontal surface drag that can determine pace or how fast or slow a ball will roll across a surface. With respect to artificial turf, friction leading to spin would be determined mainly by infill, whereas the fibers would primarily determine drag on a rolling ball.

The computer device 120 can also receive additional contextual data such as temperature, humidity, and surface wetness, among other things. This information can be recorded and utilized to compute a factor that describes how a particular piece of contextual data affects performance properties. These factors can then be used to make predictions regarding performance properties of a field under different circumstances. For example, the coefficient of restitution can be affected by a change in temperature. By capturing a factor that describes how temperature affects the coefficient of restitution, a prediction can be made. Such a factor can be utilized to aid in assessing and comparing surface properties in different contexts.

Figure 2:
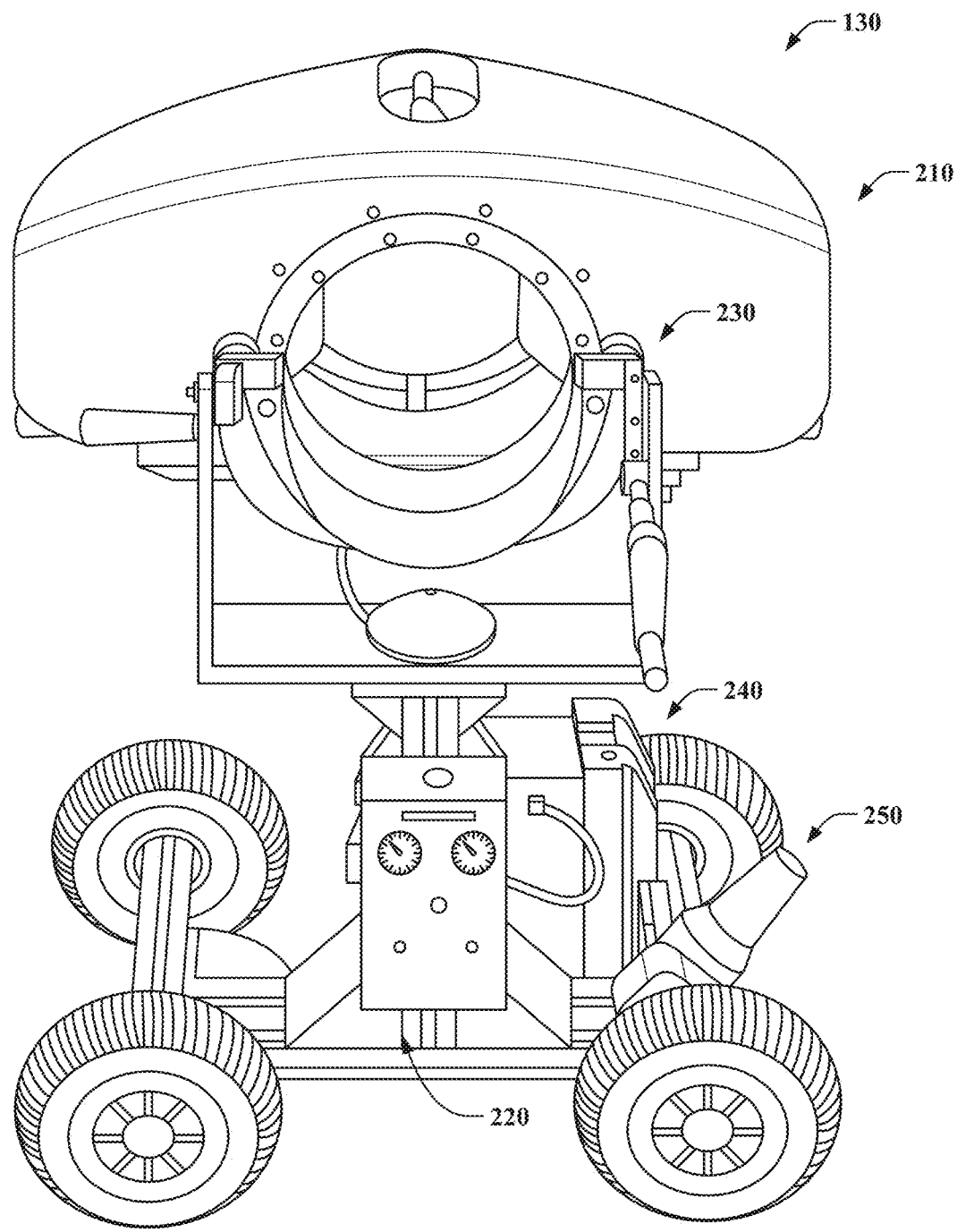
FIG. 2 depicts an illustrative ball launcher.

FIG. 2 depicts an illustrative ball launcher 130. The ball launcher 130 includes a ball receiving section and ball ejector (or a ball canon) 210, a first mechanism for adjusting the tension, compression, or elasticity of the ball ejector 220, a second mechanism for adjusting the angle and/or direction of the ball launcher 230, and a microprocessor for controlling the ball ejector, the first mechanism, and the second mechanism. The microprocessor of the ball launcher 130 may be controlled from the ball launcher (e.g., through a display, button, and/or mouse). The microprocessor of the ball launcher 130 is configured to communicate with the microprocessor of the computing device 120 and can also be controlled by the microprocessor of the computing device 120. In some embodiments, the ball launcher 130 may be controlled manually (e.g., the ball ejector, first mechanism, and second mechanism can be adjusted manually by the user), and the microprocessor of the ball launcher 130 may be optional or turned off.

The ball launcher 130 may also include a third mechanism 240 for adjusting the height of the ball launcher 130 or the ball receiving section with respect to the ground or the surface on which the ball launcher 130 is placed. The angle, direction, tension (which determines the launch speed), and height can be adjusted from the ball launcher 130, the computing device 120, or both. Balls that can be placed in the ball receiving section include a soccer ball, baseball, golf ball, basketball, volleyball, American football, tennis ball, and other types of balls. Alterations can also be made to support non-spherical objects like hockey pucks.

The ball ejector 210 may be placed at a position behind the ball, below the ball, or an angle with respect to the ball when the ball is placed in the ball receiving section. In one embodiment, the ball ejector 210 is a coil or spring type of mechanical device that exhibits a certain or predetermined level of elasticity, tension, or compression that is coupled to the first mechanism, which may be operated under the control of the microprocessor or manually by a user (e.g., the elasticity, tension or compression can be tightened or loosened by the microprocessor or manually via the first mechanism). In another embodiment, the ball ejector 210 is a pressurized type of mechanical device. Its pressure can be filled and released under the control of the microprocessor or manually by a user. A combination of the spring and pressurized device is also contemplated.

In some embodiments, the ball launcher 130 may include its own camera to record images, video, and/or audio of its view. The ball receiving section may be configured to receive one ball, and the ball launcher 130 may be configured to eject or launch one ball at a time. In some embodiments, multiple balls can be placed in the ball receiving section and launched by the ball ejector simultaneously or one by one in a sequence. The ball to be placed in ball launcher 130 should be (or the ball movement to be recorded by cameras should involve) a ball that passes the standards issued by the governing body for that sport (standard ball), such as a soccer ball that meets the requirements of International Federation of Association Football (FIFA), a baseball that meets the requirements of the Major League Baseball (MLB), etc., so that playing surface properties or performance with respect to that type of ball or sports can be assessed. However, it is understood that other balls, such as balls that do not meet the standards, under-inflated balls, over-inflated balls, and youth size balls, could also be used if needed. The ball launcher 130 may also include handles and wheels on a base 250 to facilitate the movement of the ball launcher 130.

In one instance, the ball launcher 130 can be programmed or interacted with locally or remotely over a network connection. Further, the ball launcher can include one or more sensors. For example, a sensor can be added to detect when a ball is launched. Additional sensors may detect the speed or acceleration at launch as well as the angle of launch.

In accordance with one aspect, a database can optionally be deployed to store predetermined test conditions information that includes predetermined ball launcher configuration information for configuring the ball launcher, expected ball movement information for different sports, expected playing surface properties information, or a combination thereof.

The predetermined test conditions information can include the ball launcher configuration and expected ball movement information for each type of ball or sport available for selection. The configuration information includes predetermined angle, direction, height, tension (or speed), or a combination thereof for the ball launcher. The configuration information may allow the ball launcher to simulate a real player kick, throw, swing, or other actions (e.g., ball bounce, ball roll, short ground ball, high long ball, etc.). The ball movement information includes information corresponding to configuration information or information expected for a standard ball shot from the ball launcher configured with the particular configuration information. The ball movement information may include ball bounce heights (initial ball bounce height, successive ball bounce heights, etc.), ball speed and ball spin (e.g., average speed or spin in the first 5 seconds, average speed or spin in the next 5 seconds, etc.), speed in, angle in, speed out, angle out, and other information. The playing surface properties information also includes information corresponding to configuration information, or information expected for a standard ball shot from the ball launcher being configured with the particular configuration information. The properties information may include information derived or calculated from the ball movement information, such as coefficient of friction, coefficient of restitution, deviation angle or trueness, and other information.

For example, the database can store predetermined ball launcher configuration information for soccer or a soccer ball. The configuration information may include setting the ball launcher at angle X, height Y, and speed Z. The expected or corresponding ball movement information includes an initial ball bounce height between four feet and five feet, successive ball bounce heights between three feet and four feet for the second height, between two feet and three feet for the third height, or other relationships, an average speed of five miles per hour in the first five seconds, and an average speed of three miles per hour in the next five seconds. The properties information includes a coefficient of friction between A and B, a coefficient of restitution between C and D, and a deviation angle or trueness between E and F, etc.

The ball launcher 130 may also have a default configuration such that adjustments and other controls or configurations are unnecessary. In response to selecting the type of ball or sport, the ball launcher 130 can be configured according to predetermined ball launcher configuration information for the chosen ball or sport. The predetermined ball launcher configuration information includes predetermined angle, direction, height, tension (or speed), or a combination thereof for the ball launcher 130. Upon configuring the ball launcher 130 based on the predetermined information, the ball can be shot onto a playing surface 140 subject to assessment.

In some embodiments, the ball launcher 130 may feature sensors configured to provide ball launcher information. For example, the ball launcher 130 can include an accelerometer to provide additional data on launch conditions such as initial velocity and angle for the ball at launch. The accelerometer may be installed on a flat surface of the ball launcher 130 to provide sensor data from which the velocity and launch angle can be derived. In addition, the sudden acceleration or jolt recorded by the sensor at launch may be transmitted for use as a timing signal to synchronize other recordings, such as the video recording of the ball. The accelerometer signals can also be used as feedback to provide adjustments to the ball launcher 130.

Figure 3:
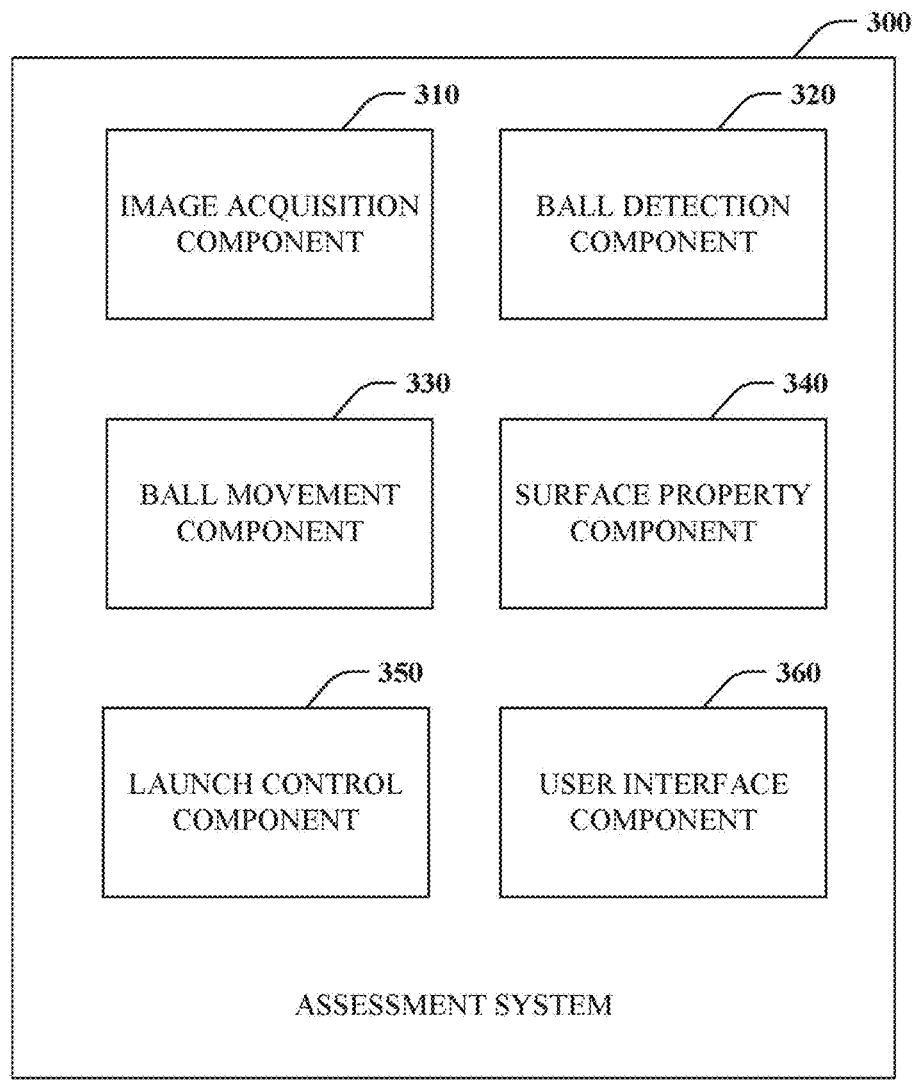
FIG. 3 illustrates a block diagram of an illustrative assessment system.

FIG. 3 depicts an illustrative assessment system 300. The assessment system includes image acquisition component 310, ball detection component 320, ball movement component 330, surface property component 340, launch control component 350, and user interface component 360. In accordance with one embodiment, the components of the assessment system 300 can be computer-executable components that comprise instructions. When executed by a processor, the instructions perform the functionality of each component. As such, a computing device is configured to be a special-purpose device or computer appliance that implements the assessment system 300. In one instance, the assessment system 300 can be executed on the computing device 120 of FIG. 1. In another instance, the assessment system 300 can be configured and provided as a network-accessible service to the computing device 120. Other configurations and implementations are also possible and contemplated, including a split of functionality between at least a network service and computing device accessing the service.

The image acquisition component 310 is configured to acquire images or frames captured by movement capture apparatuses such as cameras and video recorders. The images or frames can correspond to a still image, a plurality of still images, video made of a plurality of frames, data from a video or image that is representative of relevant content of video or image without necessarily being the entire image or an image for the visual eye, and audio showing ball movement. For example, the image acquisition component 310 can acquire images or frames capturing the movement of a ball with respect to a surface subject to assessment from one or more cameras surrounding the surface, a drone camera, a ball launcher, or a combination thereof. To clarify, images, frames, or video can capture ball movement caused by an individual playing with a ball on the playing surface (e.g., throwing, kicking, or rolling a ball) or by a ball launcher to simulate similar actions. The images or frames can show the ball in the air or contacting the playing surface. In one instance, the images can be saved and retrieved by the image acquisition component 310. Alternatively, the images can be live-streamed to the image acquisition component. Further, the images can be recorded or streamed at different times and the same or different angles, directions, heights, and positions. Images can be received, retrieved, or otherwise obtained or acquired during or after recording.

The ball detection component 320 is operable to identify a ball amongst one or more image frames. The ball detection component 320 can employ computer vision based object detection to identify a ball. Further, the object detection can involve object segmentation in which specific ball pixels are identified alone or in conjunction with bounding boxes of convention object detection. In one instance, a deep convolutional neural network can be employed to identify the ball in an image or frame. Additionally, or alternatively, a color-based filtering approach, such as HSV (Hue Saturation Value) image filter, a movement-based approach involving use of consecutive frames or reference frame differences and then value thresholding, or both can be utilized. In another instance, a template matching approach can be employed in which one or more pictures of a ball are taken beforehand and used as a template to locate the ball in a larger image and follow its movement. Such object detection or segmentation can be performed with respect to a sequence of images, or frames, over time to track a ball as it exits a launcher and interacts with a playing surface (e.g., bounce, roll . . . ).

In accordance with one aspect, compression algorithms can be exploited for detecting image-to-image or frame-to-frame movement. For example, Joint Photographic Expert Group (JPEG) compression uses Discrete Cosine Transform (DCT) coefficients, corresponding to various detail levels. These coefficients or detail levels can be employed for faster calculation of differences between images. Alternatively, many modern video codecs have embedded movement information such as inter-picture prediction and movement compensation that contains some of that information already, which would be used to minimize time and computational requirements significantly.

The ball movement component 330 is operable to derive ball characteristics or movement information from the captured images or frames, such as bounce, speed, and spin. The ball detection component 320 identifies a ball in multiple images or frames and thus determines the ball's path or trajectory. The ball characteristic component 330 can employ curve-fit standard mechanics, such as gravity, momentum, and drag, to the ball's path or trajectory to determine scale information. The scale information can be verified against internal controls such as reference objects (e.g., specifically positioned cones of a particular color) spaced at known distances or of known size that can be detected in the frame and serve to counter-verify the scale. Time information for each image or frame (time when the image or frame was captured) and duration of a video or series of frames can be utilized to derive ball movement information. The ball movement information can include ball bounce heights (e.g., initial ball bounce height, successive ball bounce heights . . . ), ball speed and spin (e.g., initial speed and spin, average speed, and spin in first five seconds, average speed and spin in the next five seconds . . . ), speed in, angle in, speed out, and angle out, among other things.

In an embodiment, Global Positioning Satellite (GPS) and other sensor data, such as that from an accelerometer or magnetometer, can be used to aid calculation of where a ball is bouncing. For instance, consider a scenario in which a user is using a smartphone for video capture. GPS and magnetometer data can be used to determine the position and heading of an observer and enable calculation of where the ball is bouncing, which can also allow calculation of specific performance information on the surface. For example, it can be determined that the centerline on a field has a high bounce, but the midfield is more of what is expected. It would also be possible to measure the entire surface or a plurality of sampled points substantially and generate a heat map or similar graphic of properties. The surface property component 340 is operable to derive, infer, or otherwise determine playing surface properties based on the ball movement information produced by the ball movement component 330. Surface properties can include a coefficient of friction, coefficient of restitution, deviation angle or trueness, or a combination thereof, among other things.

The coefficient of friction is the ratio of force required to move two sliding surfaces over each other. The ratio can be between zero and one (e.g., 0.67) in which the lower the number, the less friction of a surface. In the context of a playing field, the coefficient of friction is associated with how much topspin a surface imparts on a ball after impact. High topspin reduces the distance a ball will travel versus low topspin, as it will induce a downward force. Ball movement information related to spin and distance traveled on the ground can be utilized to compute the coefficient of friction.

The coefficient of restitution is a ratio of the final initial relative velocity between two objects after they collide. The ratio is between zero and one (e.g., 0.40), in which the higher the number, the lower the power a ball has to continue moving. More specifically, it relates to the energy of a ball that is absorbed by the surface and can influence how high a ball bounces after impact with a surface as well as ball speed. Ball movement information regarding bounce height and ball speed can be utilized to compute the coefficient of restitution.

The deviation angle is an angular measurement of the difference in a ball's path on a surface from a target line. A target line is a straight line from the ball to an intended target. The deviation angle, along with spin, determines a final position of a ball relative to the target line. For example, the surface can cause a ball to be pushed to the left or pulled to the right. Of course, deviation angle can correspond to vertical deviation as well as horizontal deviation. For instance, the surface may cause the ball to bounce or hop vertically as it rolls on the surface. This can be deemed vertical deviation at a particular angle.

The launch control component 350 is a mechanism that can interact with and control a ball launcher. In one instance, the launch control component 360 can send instructions to the ball launcher to set a specific angle, direction, height, and speed. More specifically, the launch control component 350 can invoke an application programming interface (API) to configure the ball launcher. Similarly, the launch control component 350 can request and receive current configuration values. In one particular aspect, the launch control component 350 can also request and receive input from one or more sensors associated with the ball launcher.

The user interface component 360 can be configured to facilitate user interaction with the assessment system 300. Interaction can comprise setting up tests. Setting up tests can include identifying a type of ball or sport and configuring ball movement capture devices, including cameras such as zooming in or out, when to take a picture or record a video. Further, a drone can be launched and flown to a desired location with particular camera settings. A user can also utilize the user interface to configure and adjust a mechanical ball launcher to a specific angle, direction, height, and speed, for example by way of the launch control component 350.

Further, in the case that a person is the ball launcher, the user interface can be instructive as to determining whether a person raised a ball to a height relative to the ground for a current test and prompt the person by way of the user interface component 360 to release the ball. The user interface component 360 can also output one or more determined surface properties. In one instance, the user interface component 350 can receive expected results, compare the expected results to actual results, and output a result of the comparison. The user interface component 360 can also be employed to interact with other devices or sensors, including accelerometers, gyroscopes, magnetometers, and force sensors. Further, the interface can aid in acquiring and processing contextual data such as temperature, humidity, and weather (e.g., wind, precipitation . . . ).

Figure 4:
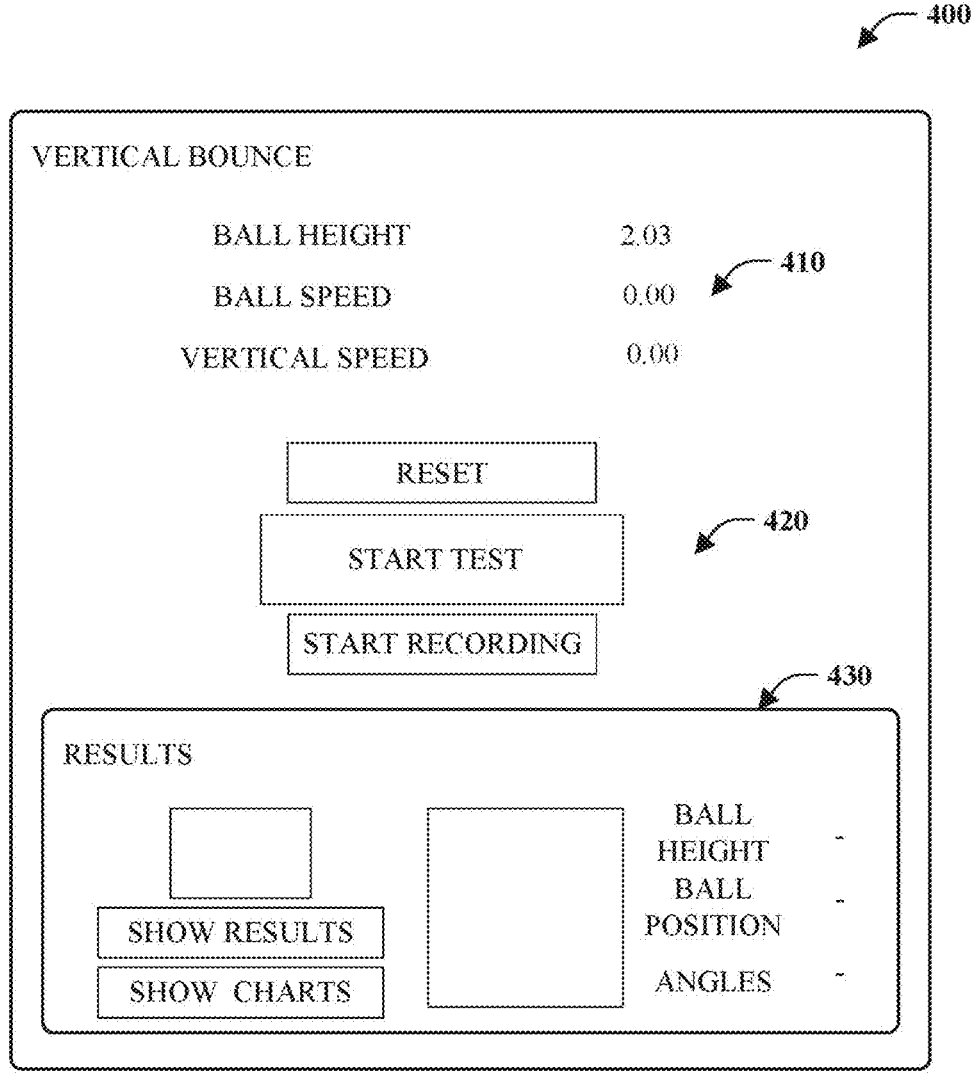
FIG. 4 is a screenshot of a sample user interface.

Turning attention to FIG. 4, a sample screenshot 400 is illustrated. The screenshot 400 can be generated by the user interface component 360 to aid in setting up and receiving the results of tests. Here, the screenshot 400 pertains to a vertical bounce test. The screenshot includes a set of initial measurements 410. The measurements include a starting ball height for a vertical bounce test of 2.03 meters. Other measurements include an initial ball speed and vertical speed of zero. The screenshot 400 also includes buttons 420. When activated by selection, the buttons 420 can trigger particular actions such as starting a test, starting a recording, and resetting a test. For example, a user can select a start-recording button to initiate ball movement capture by one or more imaging devices. Subsequently, the test can be triggered by activating a start test button. Once complete, a reset button can be selected to reset information in preparation for a subsequent test. The screenshot 400 also includes a results section 430 for presentation of test results. The results can be presented in one or more forms, such as numerical or graphical (e.g., chart). The results can specify various ball heights, positions, or angles.

Figure 5A:
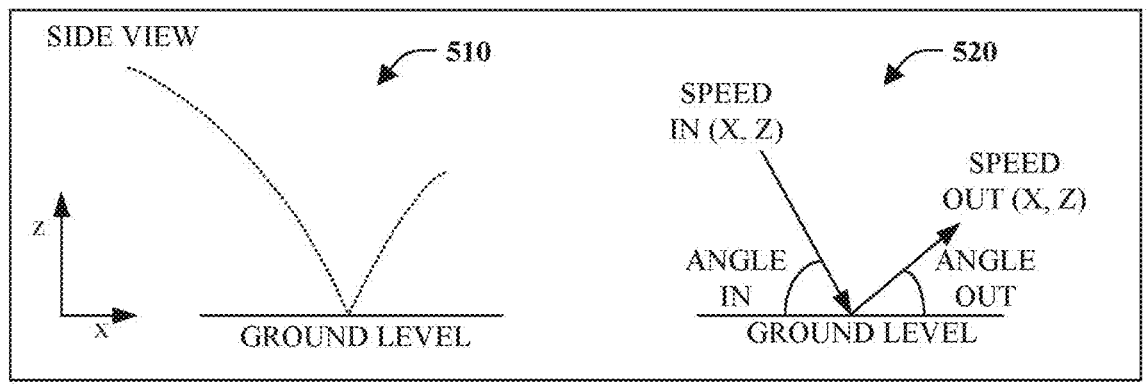
FIGS. 5A-C show a series of different views of ball movement with respect to a playing surface.
Figure 5B:
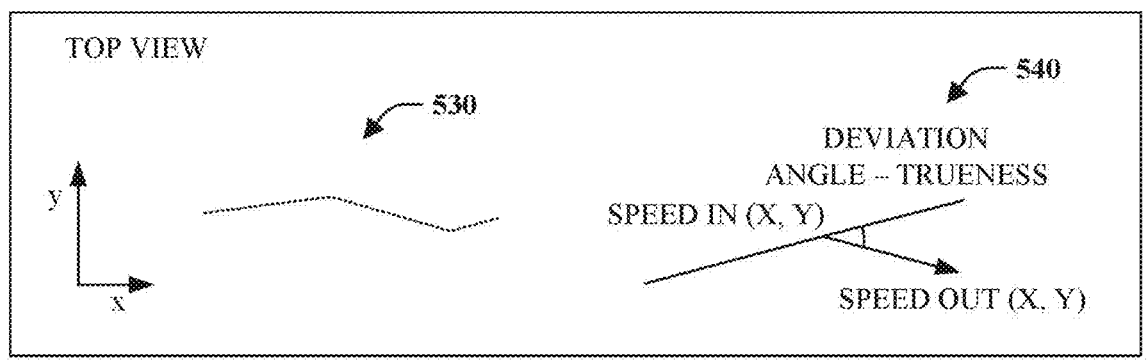
Figure 5C:
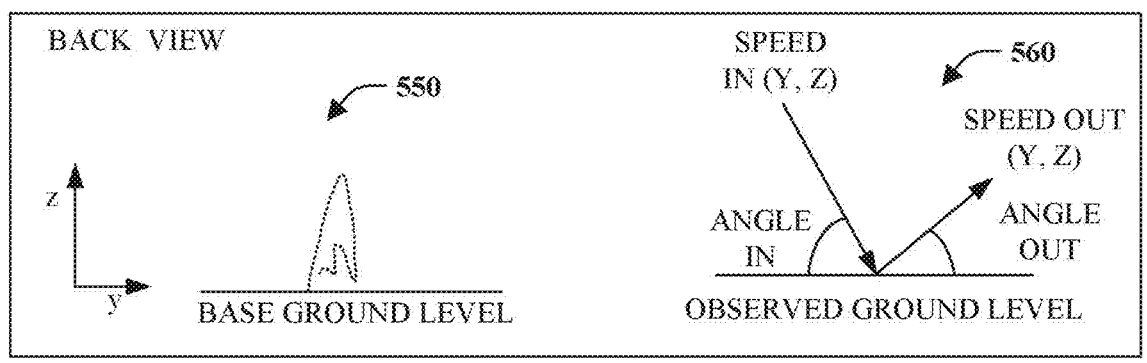

FIGS. 5A-C depict a series of views associated with ball movement and determined ball movement information or surface properties. FIG. 5A illustrates a side view from a ball movement capture device along a sideline of a field. In other words, the view captures vertical and field length ball movement on the z-axis and the x-axis. At 510, a representative view of ball movement captured by an imaging device is shown. The ball drops at an angle from a high vertical elevation and bounces of the surface. At 520, the speed and angle in of the ball as well as the speed and angle out after impact with the surface can be determined. This data can be useful in determining a coefficient of restitution. FIG. 5B depicts a top view, for example, from a drone, crane, or lift, of ball movement. Stated differently, the view represents movement relative to the length and width of a surface. At 530, a representative view is depicted of ball movement captured by an imaging device. The ball moves along a straight path but upon impact with the surface changes direction. At 540, speed in and out can be determined along with a deviation angle representing the trueness of the surface. FIG. 5C is a back view from a ball movement capture device placed at the end of a surface behind an end line, for example. Here, the view captures vertical height as well as movement across the width of a surface or, in other words, movement with respect to the z-axis and y-axis. At 550, a representative view of ball movement is illustrated as captured by an imaging device. Upon impact with the surface, the ball bounces vertically and travels right before hitting the surface and traversing left. At 560, the speed and angle in can be determined as well as the speed and angle out associated with the initial surface contact. Such information can assist in determining at least one of a coefficient of friction and coefficient of restitution.

Figure 6A:
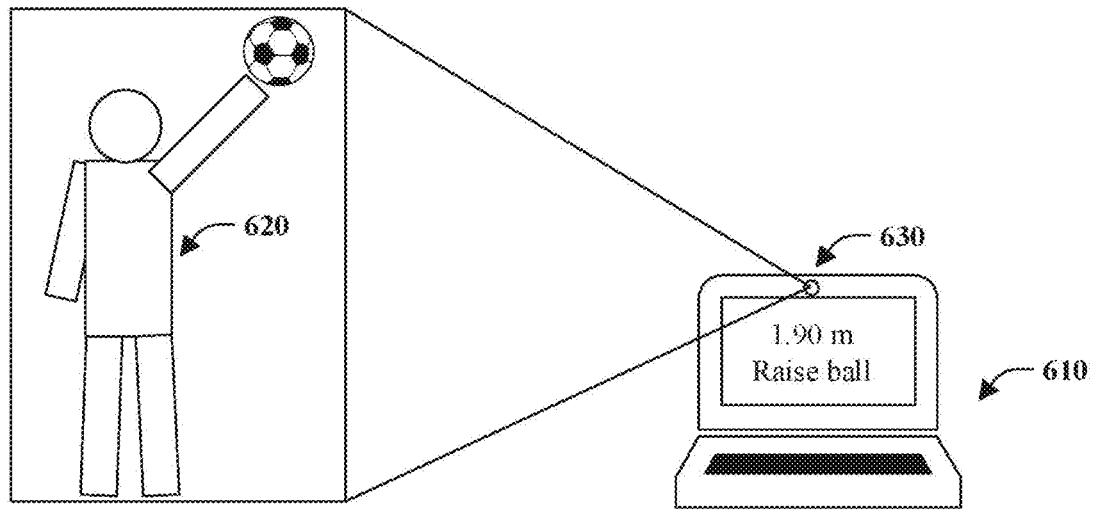
FIGS. 6A-B illustrate interaction with respect to ball launching and an illustrative view of ball movement information.

In accordance with one aspect, the assessment system 300 can be configured to be interactive, as illustrated in FIG. 6A. A user can perform actions in one instance. A computing device 610 can be employed to interact with a user 620 of the computing device by way of a graphical user interface. User instructions and actions to be performed by the user 620 can be stored in a database accessible by the assessment system. In one instance, a camera 630 on the computing device 610 can be employed to assess and instruct the user 620 regarding particular actions to facilitate ball movement capture. User instructions and actions can include asking the user to raise the ball to a specific height (e.g., 2 meters), kicking or rolling the ball beyond a specific distance (e.g., 3 yards), or other instructions and actions. Instructions can be displayed on the screen or display of the computer device 610 or given as verbal instructions to the user from the computing device 610.

A determination can be made as to whether or not the user properly performed a specified action, such as raising the ball to the required height or kicking the ball in a direction parallel to the camera so that the entire ball path can be recorded rather than toward the camera. If the action is not properly performed, the user interface can display a screen request to adjust, for example, by raising the ball from one meter to two meters in height. Subsequently, the ball could be dropped, for example, and the camera can be employed to record ball movement and determine ball movement information and surface properties.

In accordance with one aspect, instructing a user on property actions can be performed with live calculation. While the user is in the view of the ball, a determination can be made that the planned test requires the ball to be dropped at a higher position. In this case, text or other instruction information can be presented, informing the participant to raise the ball. The view of the change in position can be analyzed to either instruct the participant of a further adjustment or instruct the participant that the ball is an appropriate height to be dropped or released. Further, the computing device 610 can be employed before a test to set up the parameters of an actual test to be in accordance with the parameters of the corresponding planned test. The ground position and the size of the ball in each image or frame are used as an internal reference for estimating the ball's position. The computing device 610 use application features described above in connection with locating a ball as an object on the image (or other location, movement, or speed determinations) in determining whether the user has now raised the ball to a height relative to the ground for the current test, and in response instruct the user to release the ball (which is being recorded as a result of the interaction).

Figure 6B:
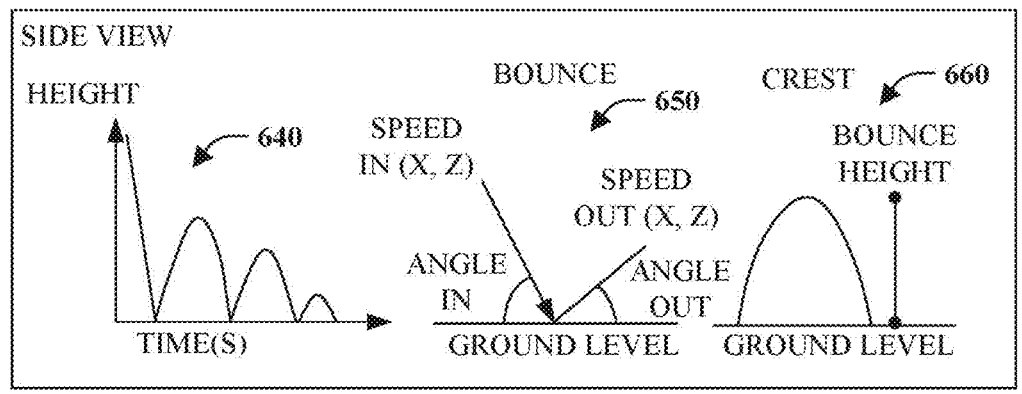

FIG. 6B depicts an illustrative view of the camera 630 on the computing device 610 and sample ball movement information computed based on the view. At numeral 640, the path of the ball as recorded by the camera 630 is illustrated. As shown, the ball starts at some initial height then is dropped, resulting in three bounces. The assessment system 300, executing on or accessible by the computing device 610, can analyze the captured image and determine various information able the ball, including speed and angle in and out associated with a bounce as shown at numeral 650 and the crest and bounce height as depicted at numeral 660. In one instance, the analysis and determination can be performed in near real-time (e.g., accounting for inherent delays in communication and processing). The path and ball movement information are thus determined as the ball is moving.

Figure 7:
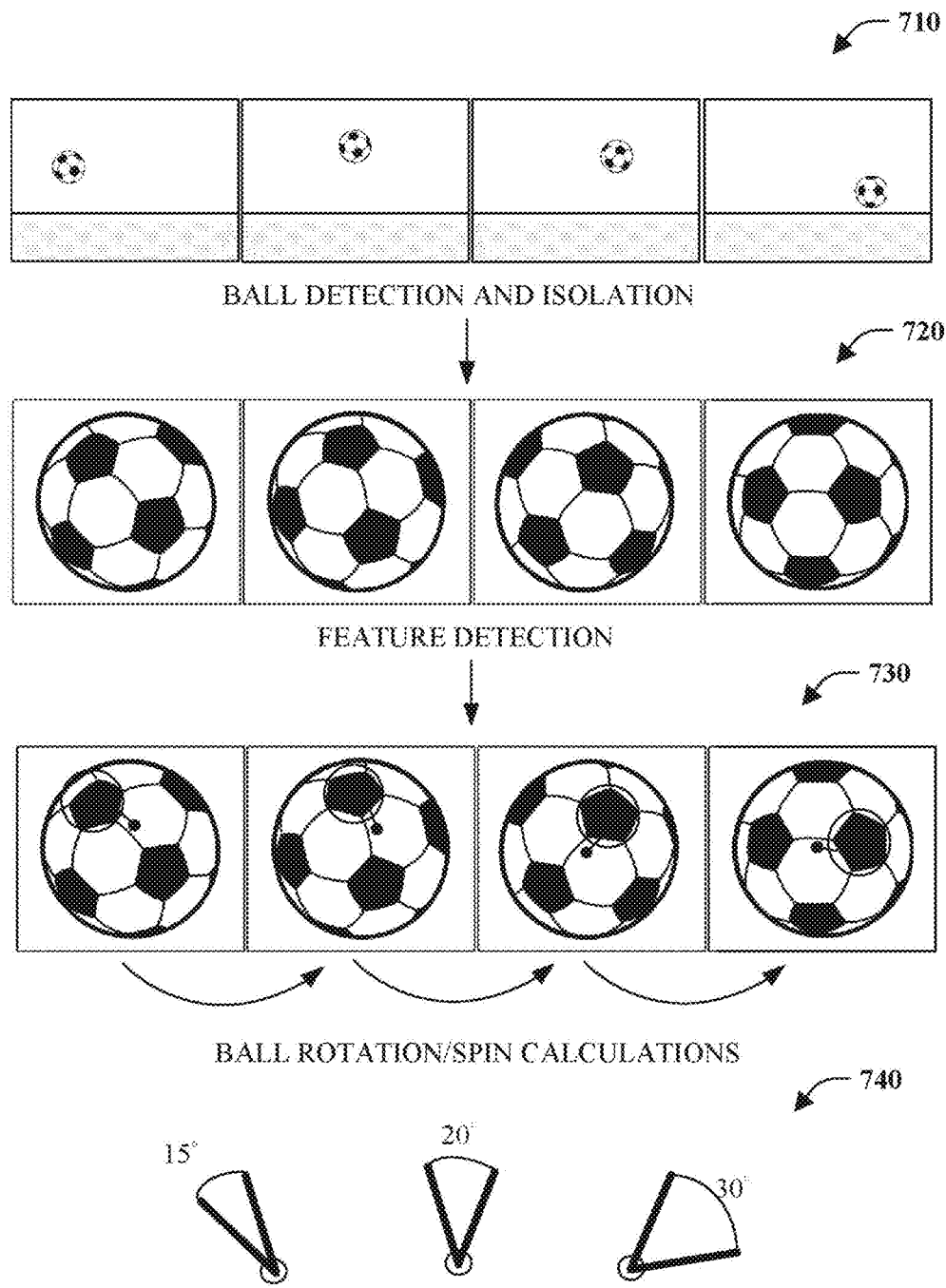
FIG. 7 depicts an illustration of successive frames showing the determination of the ball's spin.

FIG. 7 depicts an illustration of successive frames showing the determination of the ball's spin. At 710, a series of images or frames is depicted that capture a path of a ball. For example, the series of images or frames can be produced by a camera or video recorder that tracks the ball's motion along a path. Next, the images or frames are processed to identify the ball, remove the background, and zoom in on the ball. This process results in a series of images of balls, here soccer balls, as shown at 720. From the series of images of the ball, feature extraction can be performed. Feature extraction can employ computer vision techniques to identify the center of the ball and a particular feature of the ball, such as one of the black pentagons or white hexagons that form a soccer ball. At 730, each image or frame has a solid black dot indicating the center of the ball and a transparent circle around a particular black hexagon as the feature. Based on the movement of the feature, namely the identified black hexagon, with respect to the center of the ball, calculations can be performed to identify the ball rotation or spin. It can be determined that from the first image to the second image, there is a fifteen-degree rotation, between the second and the third image, there is a twenty-degree ball rotation, and from the third image to the fourth image, there is a thirty-degree rotation of spin on the ball, as shown at 740.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the assessment system 300 can employ such mechanisms in various ways with respect to imagine processing. For instance, the ball detection component 320 can utilize a machine learning such as a convolutional neural network to detect a ball in an image. Other components can use such mechanisms to make predictions that replace measurements that may not be available due to a faulty image capture device or poor image.

Figure 8:
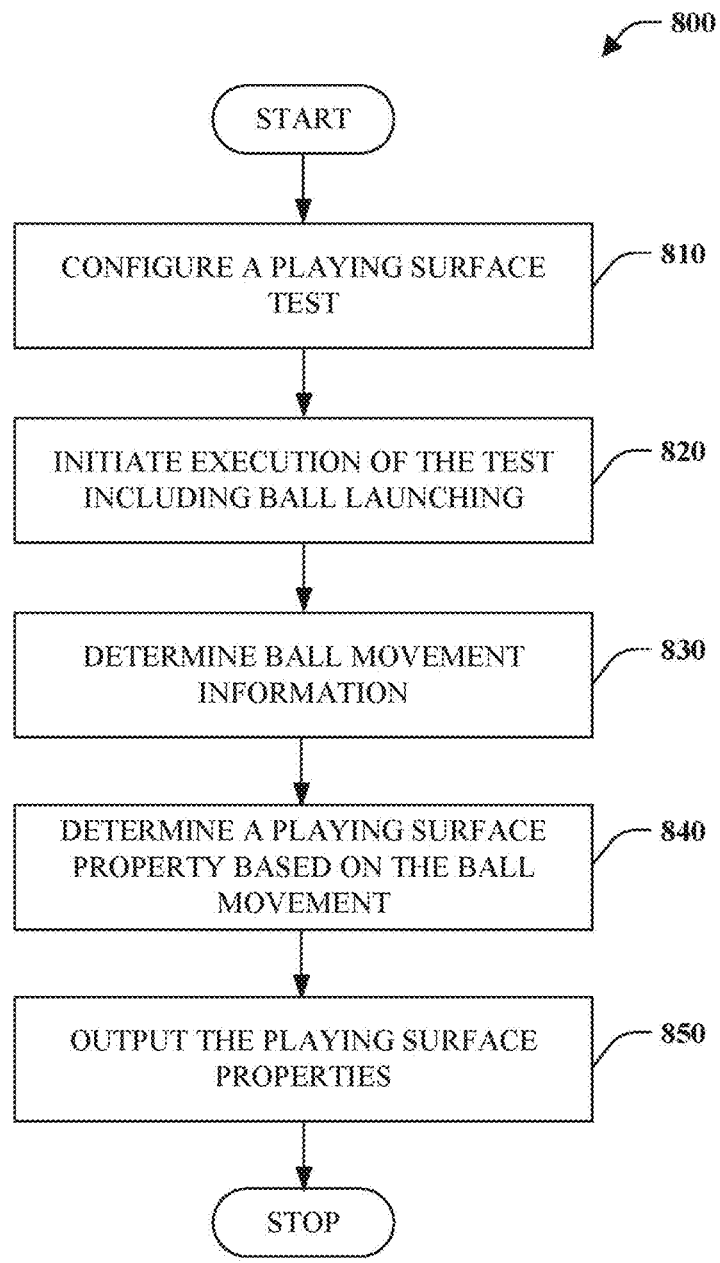
FIG. 8 is a flow chart diagram of a method of surface assessment method.
Figure 9:
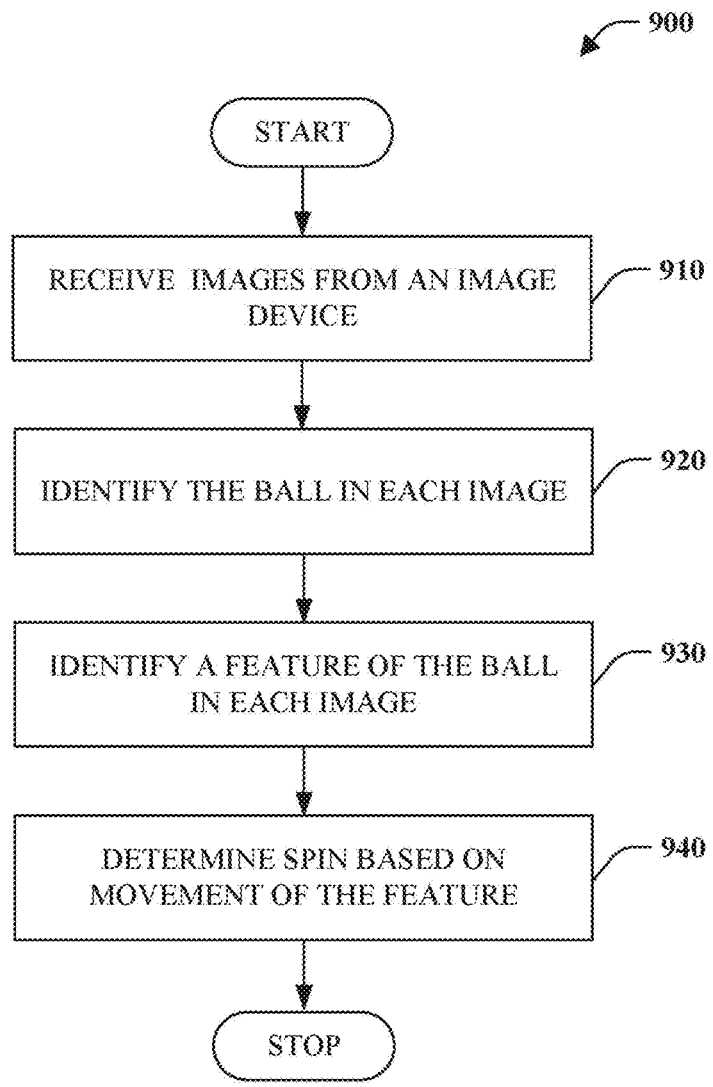
FIG. 9 is a flow chart diagram of spin detection.

In view of the example systems described above, methods that may be implemented in accordance with the disclosed subject matter will be better appreciated with reference to flow chart diagrams of FIGS. 8 and 9. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 8 illustrates a surface assessment method 800. The surface assessment method 800 can be performed by the assessment system 300 in conjunction with a ball launcher 130, a ball 135, and various ball movement capture devices 110.

At numeral 810, a playing surface test is configured. Configuration can correspond to movement of equipment into places, such as the ball launcher and ball movement capture devices. Further, configurations can involve selecting a test to perform and programmatically modifying equipment to perform the test. For example, a ball launcher can be set to a certain angle and velocity. Further, cameras can be activated and synchronized to enable movement of the ball to be captured upon ejection by the ball launcher, among other things.

At numeral 820, execution of the test is initiated. Initiation can involve triggering a mechanical ball launcher to shoot a ball on the playing surface or prompting a person to drop, throw, hit, or kick a ball on the playing surface. In one instance, initiation can first involve having a drone flown, or a crane or lift positioned, to enable ball movement to be captured from overhead. Further, initiation can trigger ball movement capture devices, such as cameras, to begin capturing movement of the ball.

At 830, ball movement information can be determined from a series of recorded images or frames. The images or frames can capture a ball and the ball's interaction with a playing surface such as a field or court. Prior to determining ball movement information, the ball is detected in the images or frames.

Computer vision based object detection or segmentation techniques can be employed to identify the ball in each image or frame. For example, a color-based filtering approach, such as an HSV (Hue Saturation Value) image filter or deep convolutional neural network, can be employed to identify the ball. Object detection or segmentation can be performed for each of a series of images or frames to determine the ball's path or trajectory. In one instance, determining the ball movement information includes locating the ball in each image or frame and translating the position of the ball in pixels in each of the one or more images or frames into a real-world position of the ball to determine the trajectory.

One or a combination of two processes can be utilized to perform this translation. In a first process, internal controls or sets of reference objects in the frame separated by a known distance (e.g., strategically placed cones on the field) are automatically detected using the same or different techniques used to identify ball pixels (e.g., HSV filtering, value thresholding, blurring, and key point detection . . . ). The pixel distance between these objects is measured and correlated with the known actual distance between them. This enables scale information to be obtained, such as a pixel-to-distance ratio. The scale information can then be applied to the ball to determine the ball's real-life position in each frame, and consequently, the ball's trajectory in a recording. In a second process, vertical acceleration of the ball during free fall can be employed to determine scale. Vertical acceleration in the frames in pixels is equivalent to the acceleration of gravity. Thus, when the ball is in free fall, the software can use vertical position changes in pixels between frames to generate a curve fit function of the trajectory and obtain scale information, such as the pixel-to-distance ratio. Scale information, such as a pixel-to-distance ratio, can then be applied to a ball to determine the ball's real-world position in each frame and thus the ball's trajectory.

Once a trajectory is identified, bounce and crest positions can be determined by identifying local minima and local maxima in the ball trajectory. The bounce positions indicate impact with a playing surface. As such, ball movement information can be determined with respect to the bounce positions. Further, time information for each image or frame (time when the image or frame was captured) and duration of a video or series of frames can be utilized to derive ball movement information. The ball movement information can include ball bounce heights (e.g., initial ball bounce height, successive ball bounce heights . . . ), ball speed and spin (e.g., initial speed and spin, average speed, and spin in first five seconds, average speed and spin in the next five seconds . . . ), speed in, angle in, speed out, and angle out, among other things.

At numeral 840, one or more playing surface properties can be determined based on the ball movement information. Surface properties can include a coefficient of friction, coefficient of restitution, deviation angle or trueness, or a combination thereof, among other things. The coefficient of friction is the ratio between zero and one of the force required to move two sliding surfaces over each other. In the context of a playing surface, the coefficient of friction is associated with how much topspin a surface imparts on a ball after impact and the pace of a ball as it rolls across the surface. The coefficient of restitution is a ratio between zero and one of the final initial relative velocity between two objects after they collide. More specifically, the coefficient of restitution relates to the energy of a ball that is absorbed by the surface and can impact how high a ball bounces after impact with a surface as well as ball speed. The deviation angle is an angular measurement of the difference in a ball's path on a surface from a target line. A target line is a straight line from the ball to an intended target. The deviation angle, along with spin, determines a final position of a ball relative to the target line. In one instance, ball movement information can also function as a surface property, such as the amount of spin associated with a ball that impacts the surface.

At numeral 850, the playing surface properties are output. In one instance, one or more playing surface properties can be conveyed or transmitted for display on a display device.

For example, playing surface properties can be displayed on a graphical user interface of a computing device associated with playing surface assessment. In another instance, outputted playing surface properties can be compared to expected playing surface properties a result of the comparison can be returned and subsequently conveyed for display on the display device.

FIG. 9 is a flow chart diagram of a method 900 of spin detection. The method can be performed by the assessment system 300 and, more particularly, ball movement component 330. The method 900 can determine ball rotation or spin after impact with a playing surface.

At numeral 910, images are received from an imaging device. The images can be a sequence of images over time. In one instance, the images can correspond to frames of a video. The images can be standard picture images or those produced by Lidar or other imaging technology.

At numeral 920, the ball is identified in each image. Computer-vision-based techniques, including color-based filtering or neural networks, can be employed to detect the ball within an image or frame. Once detected, the background can be removed, and the image zoomed or cropped to show the ball at substantially the same scale across the images.

At reference numeral 930, all ball features can be identified. The identified ball feature can be a characteristic of the ball visible in at least a subset of the images. For example, the feature can be a particular black pentagon on a soccer ball, a logo, or another permanent or temporary mark. In one instance, a center of the ball can also be identified and linked to the ball feature such that the feature is in a particular position and distance from the center of the ball.

At numeral 940, the spin or rotation of the ball is determined based on the movement of the feature from one frame to another. If the ball is not spinning at all, one would expect there to be no difference between the position or orientation of the ball between two images. The difference in position or orientation can be captured by an angular measurement, such as fifteen degrees.

The subject disclosure pertains to the technical problem assessing playing surface properties based on recordings produced by ball movement capture devices. The technical solution is recording analysis that determines ball movement information from a series of images or frames, including bounce heights, ball speed, ball spin, and angle. From this information, playing surface properties can be determined, such as a coefficient of friction, coefficient of restitution, and angle of deviation. The surface property information can be utilized to verify a surface performs as expected and initiate maintenance of the surface or portion thereof when it does not perform as expected.

Surface assessment can be performed based on recordings of movement capture devices. In one instance, the capture device can record an image or video. Video comprises a sequence of images called frames. A sequence of images herein can thus correspond to series of still images or a video. While image recording is a focus herein, sound recordings can also be employed. For instance, a sound recording can be utilized to measure or confirm when a ball contacts a surface. The sound can be associated with a recorded video or separate from the video. As such, movement capture apparatuses can include microphones separate or integrated with video cameras.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
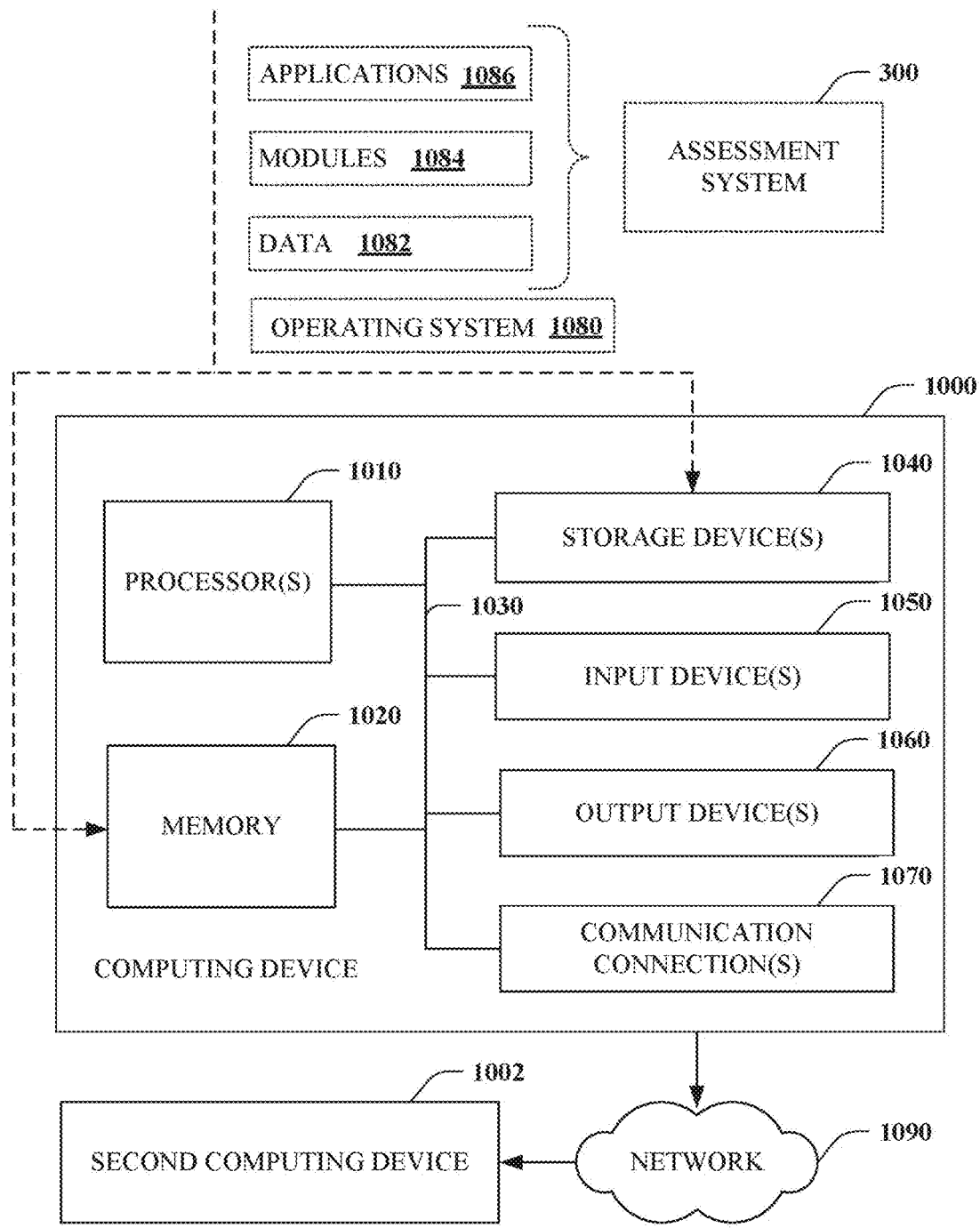
FIG. 10 is a block diagram illustrating a suitable operating environment for aspects of the subject disclosure.

To provide a context for the disclosed subject matter, FIG. 10 and the following discussion are intended to provide a brief, general description of a suitable environment in which various aspects of the disclosed subject matter can be implemented. However, the suitable environment is solely an example and is not intended to suggest any limitation regarding scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node . . . ). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1010 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1000, such as during start-up, can be stored in non-volatile memory, while volatile memory can act as external cache memory to facilitate processing by the processor(s) 1010, among other things.

The storage device(s) 1040 include removable/non-removable, volatile/non-volatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine in accordance with the logic provided thereby.

All, or portions, of the disclosed subject matter can be implemented using standard programming and/or engineering techniques to produce software, firmware, hardware, or any combination thereof to control the computing device 1000 to realize the disclosed functionality. By way of example and not limitation, all, or portions, of the assessment system 300 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software.

For example, the assessment system 300 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad . . . ), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth . . . ), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a local area network (LAN) or a wide area network (WAN) such as the Internet. The second computing device 1002 can be another processor-based device with which the computing device 1000 can interact. In one instance, the second computing device 1002 can correspond to a smart ball movement capture apparatus or a ball launcher. The first computing device can interact with such a mechanism over the network 1090 to set up and assess a surface.

What has been described above includes examples of aspects of the claimed subject matter. It is, of course, not possible to describe every conceivable combination of components or methodologies for purposes of describing the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer system, comprising:
a processor coupled to a memory that stores instructions to perform surface property assessment that, when executed by the processor, cause the processor to:
extract ball movement information from a sequence of images that record ball movement across a playing surface to be assessed, wherein extraction of the ball movement information comprises location of the ball in the images, translation of a position of the ball in pixels in each of the images into a real-world position of the ball to determine ball trajectory, and ball spin determined based on identifying a center of the ball in the images, detecting features of the ball in the images, and tracking the features that move in the images in reference to the center of the ball; and
determine a property of the playing surface based on the extracted ball movement information, wherein the determined property includes one of a coefficient of friction, a coefficient of restitution, or a deviation angle.

2. The system of claim 1, wherein location of the ball in each of the images includes isolation of pixels corresponding to the ball from a background in each of the images using hue saturation value (HSV) filtering and movement detection.

3. The system of claim 1, wherein translation of the position of the ball in pixels in each of the images into the real-world position of the ball includes automatic extraction of pixels corresponding to reference objects to measure pixel distance between the reference objects.

4. The system of claim 1, wherein translation of the position of the ball in pixels in each of the images into the real-world position of the ball includes calculation of a pixel-to-distance ratio using a vertical change in the trajectory of the ball in pixels in the images.

5. The system of claim 1, wherein extracting ball movement information from the images further comprises determining speed of the ball based on the real-world position of the ball and timing information from the images.

6. The system of claim 1, wherein the instructions further cause the processor to determine bounce positions and crest positions by identifying local minima and local maxima in the ball trajectory.

7. The system of claim 1, wherein the instructions further cause the processor to determine the ball movement information based on ball capture information from one or more movement capture apparatuses associated with the ball, and ball launch information from an accelerometer mounted on a ball launcher, wherein the processor synchronizes the ball capture information with the ball launch information using a jolt recorded by the accelerometer as a timing signal.

8. The system of claim 1, wherein the instructions further cause the processor to generate expected ball movement information based on predetermined test conditions and determine the property of the playing surface based on the extracted ball movement information and comparison of the extracted ball movement information with the expected ball movement information.

9. The system of claim 1, further comprising:
a ball launcher configured to shoot a ball onto the playing surface; and
a ball capture system comprising at least one camera and configured to record the images showing the ball, wherein the instructions further cause the processor to communicate with and operate the at least one camera to record the images showing the ball in response to the ball launcher shooting the ball.

10. A method, comprising:
detecting a ball shot onto a playing surface by a ball launcher;
triggering recording of the ball by a camera in response to detecting the ball shot onto the playing surface;
extracting ball movement information from the recording;
determining a playing surface property from the ball movement information based on the extracted ball movement information and comparison of the extracted ball movement information with expected ball movement information generated based on predetermined test conditions, wherein the playing surface property is a coefficient of friction, a coefficient of restitution, or a deviation angle; and
transmitting, for display on a display device, the playing surface property.

11. The method of claim 10, wherein extracting the ball movement information comprises locating the ball in each image of the recording and translating a position of the ball in pixels in each image into a real-world position of the ball to determine ball trajectory.

12. The method of claim 10, wherein extracting the ball movement comprises determining ball spin from a sequence of images by isolating the ball from a background, setting a frame of reference on the ball in the background, detecting features of the ball, and tracking the features that move relative to the frame.

13. The method of claim 10, further comprising configuring the ball launcher to have a predetermined angle, direction, height, tension, or a combination thereof based on a predetermined ball launcher configuration information.

14. The method of claim 10, further comprising determining the ball movement information based on ball capture information from one or more sensors associated with the camera and ball launch information from one or more sensors associated with the ball launcher.

15. The method of claim 10, wherein the comparison of the extracted ball movement information and the expected ball movement information includes a comparison of at least one of initial ball bounce height, successive ball bounce height, ball speed, angle, and ball spin.

16. The method of claim 10, further comprising:
determining a target line that is a straight line from the ball to an intended target; and
launching the ball onto the playing surface with a predetermined deviation angle relative to the target line, and a predetermined spin, wherein
extracting the ball movement information includes at least a trajectory of the ball relative to the target line or the intended target, and the spin of the ball, and
determining the playing surface property includes determining the coefficient of friction based on the trajectory of the ball relative to the target line or the intended target.

17. A method of assessing properties of a field, comprising:
executing, on a processor, instructions that cause the processor to perform operations comprising:
conveying, for display on a display device, user instructions requesting a user perform an action on the field;
operating a camera to generate a recording of ball movement;
determining if the user performed the action based on the recording;
conveying, for display on the display device, adjusted user instructions when the user did not properly perform the action;
extracting ball movement information from the recording when the user did properly perform the action;
determining properties of the field from the ball movement information, wherein the properties include a coefficient of friction, a coefficient of restitution, a deviation angle, or a combination thereof, and
conveying, for display on the display device, the properties.

18. The method of claim 17, wherein extracting the ball movement information comprises locating the ball in each image of the recording and translating a position of the ball in pixels in each image of the recording into a real-world position of the ball to determine ball trajectory.

19. The method of claim 17, further comprising determining the ball movement information based on ball capture information from one or more sensors associated with the camera and ball launch information from one or more sensors associated with a ball launcher.

20. The method of claim 17, further comprising:
generating an expected ball movement information based on predetermined test conditions; and
determining the properties of the field based on a comparison of the extracted ball movement information with the expected ball movement information.

* * * * *